United States Patent
D'Agostino

(10) Patent No.: US 11,972,029 B2
(45) Date of Patent: *Apr. 30, 2024

(54) SYSTEM AND METHOD FOR PROVIDING TRUSTED LINKS BETWEEN APPLICATIONS

(71) Applicant: The Toronto-Dominion Bank, Toronto (CA)

(72) Inventor: Dino Paul D'Agostino, Richmond Hill (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/192,347

(22) Filed: Mar. 29, 2023

(65) Prior Publication Data
US 2023/0229814 A1    Jul. 20, 2023

Related U.S. Application Data

(63) Continuation of application No. 16/890,701, filed on Jun. 2, 2020, now Pat. No. 11,640,482.

(51) Int. Cl.
*G06F 21/64* (2013.01)
*G06F 16/23* (2019.01)
(Continued)

(52) U.S. Cl.
CPC .......... *G06F 21/64* (2013.01); *G06F 16/2379* (2019.01); *G06F 21/6245* (2013.01); *G06F 21/72* (2013.01)

(58) Field of Classification Search
CPC .................................................. G06F 21/6245
See application file for complete search history.

(56) References Cited

U.S. PATENT DOCUMENTS 8,572,593 B2   10/2013  Vedula
8,694,795 B1    4/2014  Aissi
(Continued)

FOREIGN PATENT DOCUMENTS

CN      110032895 A   *  7/2019
CN      110032895 A1     7/2019
WO    2013188830 A1    12/2013

*Primary Examiner* — John B King
*Assistant Examiner* — Alex D Carrasquillo
(74) *Attorney, Agent, or Firm* — CPST Intellectual Property Inc.; Brett J. Slaney

(57) ABSTRACT

A system and method are provided for providing trusted links between applications. The method is executed by a registry server device. The method includes storing in a database coupled to the registry server device, query parameters for a plurality of applications; receiving, from a first application, a first request to obtain a trusted link to communicate with a second application; providing the trusted link, wherein the trusted link is signed by the registry server device and identifies one or more query parameters of the first request; sending to the first application, a first response comprising the trusted link; receiving, from the second application, a second request to verify, at least in part, permissions defined by the one or more query parameters identified based on to the trusted link; and sending to the second application a second response comprising a result of the verification that enables the second application to verify that the signed trusted link was not tampered with and that the one or more query parameters of the first request have not been tampered with.

20 Claims, 11 Drawing Sheets

(51) Int. Cl.
    *G06F 21/62*    (2013.01)
    *G06F 21/72*    (2013.01)

(56) References Cited

U.S. PATENT DOCUMENTS

| | | | |
|---|---|---|---|
| 9,684,501 B2 * | 6/2017 | Falkenburg | G06F 8/61 |
| 9,762,568 B2 | 9/2017 | Doleh et al. | |
| 9,807,091 B2 | 10/2017 | Giobbi | |
| 10,346,826 B2 | 7/2019 | Boudville | |
| 10,423,691 B1 * | 9/2019 | Patel | G06F 16/9566 |
| 10,498,847 B2 | 12/2019 | Popowitz et al. | |
| 10,594,673 B1 * | 3/2020 | Larios | G06F 9/546 |
| 2002/0133697 A1 | 9/2002 | Royer | |
| 2012/0144407 A1 | 6/2012 | Hacigumus et al. | |
| 2012/0166803 A1 | 6/2012 | Hu et al. | |
| 2013/0275560 A1 * | 10/2013 | Bestmann | H04L 41/0803 |
| | | | 709/219 |
| 2014/0095874 A1 | 4/2014 | Desai | |
| 2014/0177839 A1 | 6/2014 | Wagner et al. | |
| 2014/0181518 A1 | 6/2014 | Kim et al. | |
| 2015/0040145 A1 * | 2/2015 | Partridge | G06F 9/547 |
| | | | 719/320 |
| 2015/0302215 A1 * | 10/2015 | Hu | G06F 21/62 |
| | | | 726/30 |
| 2015/0319143 A1 | 11/2015 | Kim et al. | |
| 2015/0327072 A1 | 11/2015 | Powell et al. | |
| 2016/0142859 A1 * | 5/2016 | Molinet | H04L 67/63 |
| | | | 709/203 |
| 2017/0257216 A1 * | 9/2017 | Perga | H04W 12/06 |
| 2017/0289338 A1 | 10/2017 | Riva et al. | |
| 2020/0403986 A1 | 12/2020 | Gosalia | |
| 2021/0144147 A1 | 5/2021 | Sisley et al. | |

\* cited by examiner

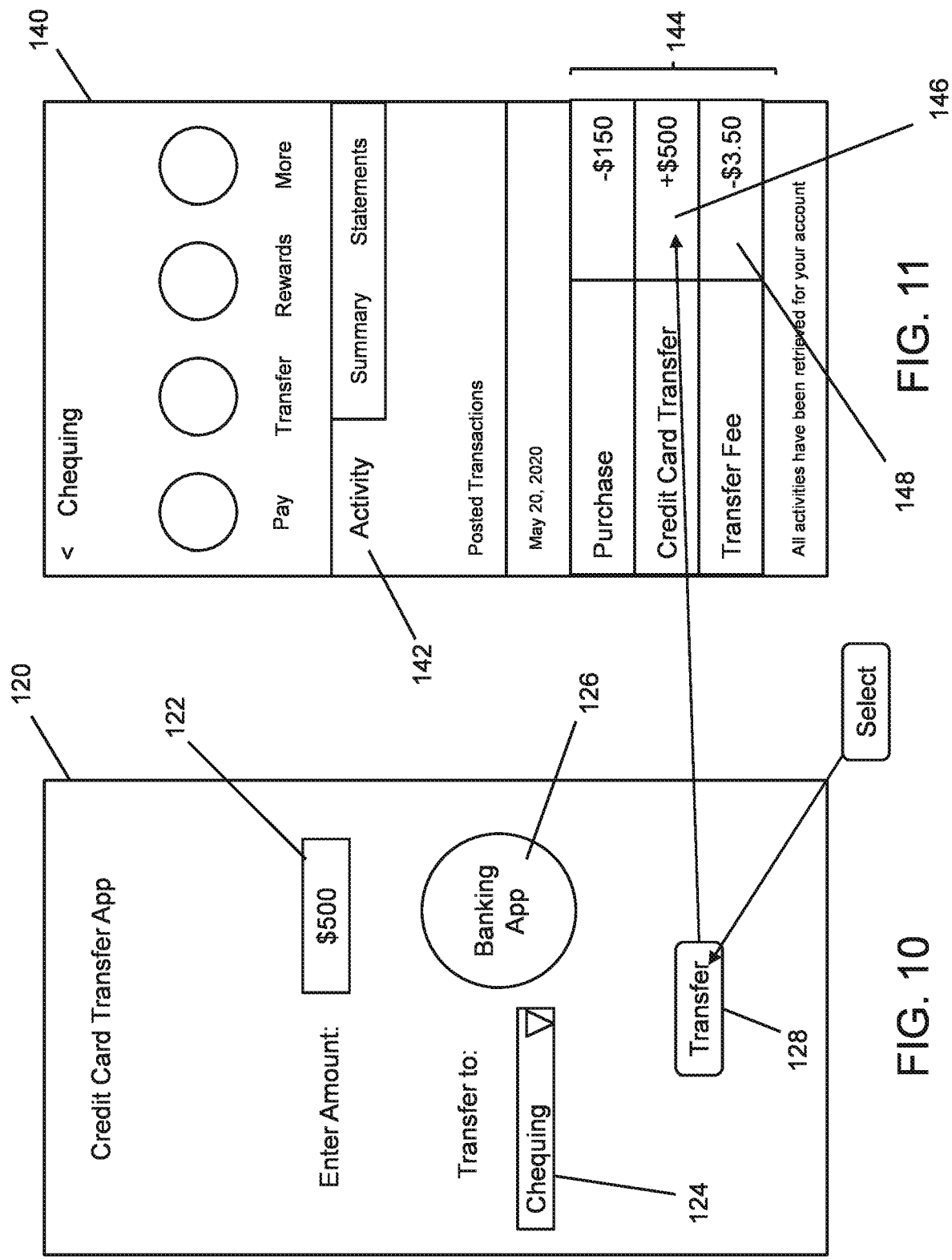

SYSTEM AND METHOD FOR PROVIDING TRUSTED LINKS BETWEEN APPLICATIONS

CROSS-REFERENCE TO RELATED APPLICATION(S)

This application is a Continuation of U.S. patent application Ser. No. 16/890,701 filed Jun. 2, 2020, the contents of which are incorporated herein by reference in their entirety.

TECHNICAL FIELD

The following relates generally to providing trusted links between applications.

BACKGROUND

Applications used by electronic devices may desire to (or be required to) link or otherwise communicate with each other. For example, one application may request information from another application, request that the other application process data, request that the other application execute an operation, or invoke a user interface of the other application in a dedicated "app" or via a webpage hosted by a browser.

Depending on the nature of the application, and the data being consumed or shared by the application, an application that wishes to communicate with or invoke another application may require credentials, permissions, and/or have restrictions on which parameters and data can be shared. Typically, such permissions and parameters that can be released to another application are hardcoded into at least one of the applications. Therefore, if changes need to be made to how these applications communicate or link to each other, significant programming efforts may be required, making the changes (or the inter-application functionality itself) costly or prohibitive to implement.

BRIEF DESCRIPTION OF THE DRAWINGS

Embodiments will now be described with reference to the appended drawings wherein:

FIG. 10 is an example of a graphical user interface for a fund transfer option for a credit account application.

FIG. 11 is an example of a graphical user interface for an account details page of a financial institution application showing a transfer initiated using the credit account application.

DETAILED DESCRIPTION

Figure 1:
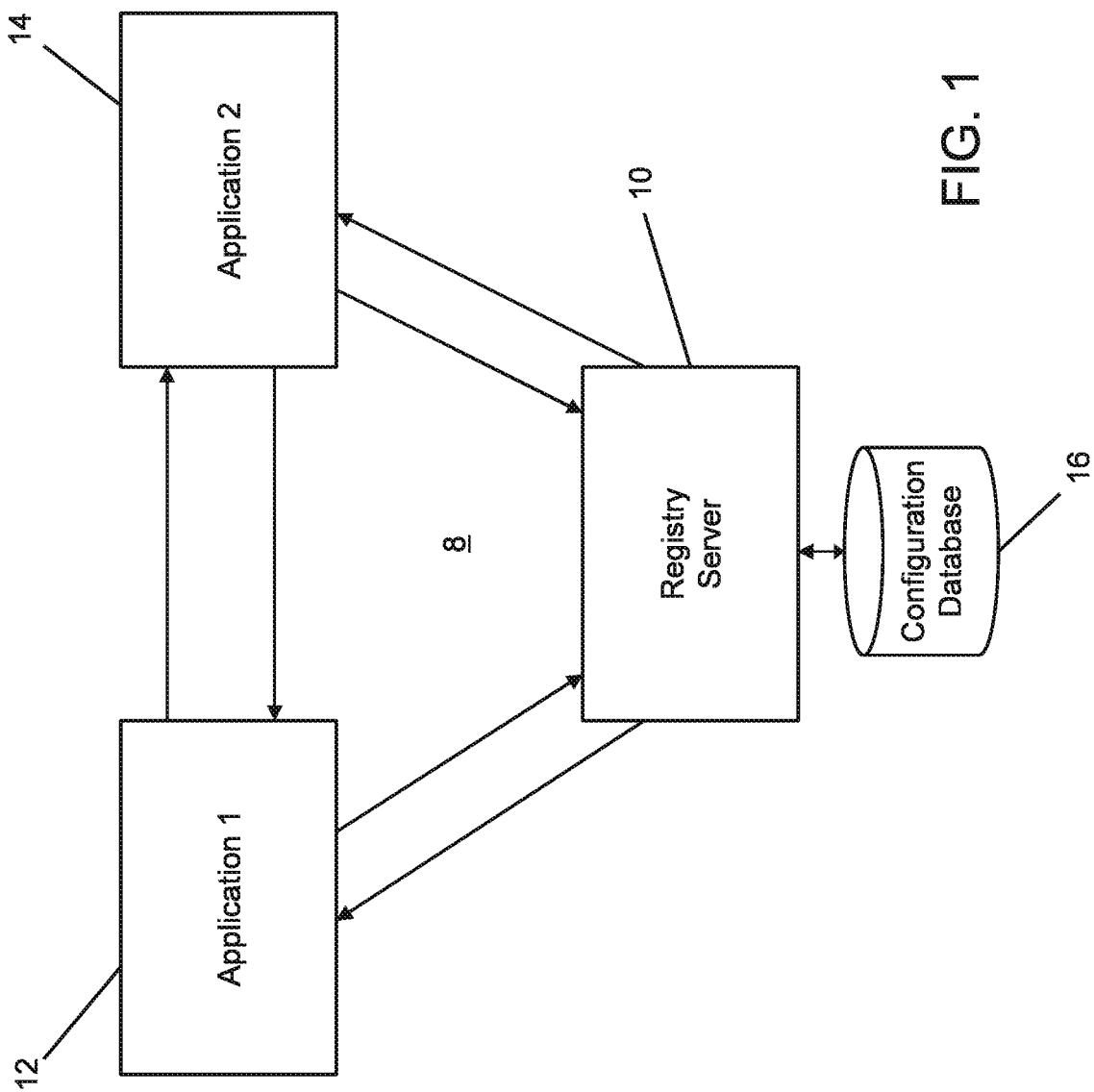
FIG. 1 is a schematic diagram of an example of an inter-application computing environment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

The system described herein can provide a secure approach to enabling applications to communicate with and share information and data with each other. In the following description, the term "application" may refer to third party apps, native apps, or applications accessed via a web browser or other application platform. The system can be used to securely invoke functionality and link into user interface screens of other applications through a trusted third party, referred to herein as a registry sever or registry server device that provides a registry service. The registry server provides a mechanism to store configuration data or configuration files rather than require hardcoding within the applications. This so called "zero development" approach trades an initial upfront effort in establishing the trusted third party, for the flexibility and scalability of using configuration files to add or change functionality.

In this way, hardcoded permissions can be avoided for inter-app linking and the system can decouple the need to preprogram which parameters to release to another application. For example, a credit account app can invoke a banking app to initiate a transfer of funds by using the trusted registry server to determine which parameters can or should be released, such as account balances, "from" account, "to" account, amounts, surcharges, etc.

It will be appreciated that while examples provided herein are directed to financial- or banking-related applications and communications therebetween, the principles discussed herein equally apply to other applications that wish to, or are required to, securely communicate and/or share data and information between them.

Certain example systems and methods described herein enable trusted links to be established between applications or "apps". In one aspect, there is provided a registry server device for providing trusted links between applications. The device includes a processor, a communications module coupled to the processor, and a memory coupled to the processor. The memory stores computer executable instructions that when executed by the processor cause the processor to store in a database coupled to the registry server device, configuration files for a plurality of applications, each configuration file comprising an indication of data that can be shared with other applications. The memory also stores computer executable instructions that when executed by the processor cause the processor to receive via the communications module, from a first application, a first request to obtain a trusted link to a second application and send to the first application, via the communications module, a first response comprising the trusted link. The memory also stores computer executable instructions that when executed by the processor cause the processor to receive via the communications module, from the second application, a second request to verify the trusted link provided by the first application in association with the second application being invoked by the first application, and send to the second application, via the communications module, a second response comprising a result of the verification.

In another aspect, there is provided a method of providing trusted links between applications. The method is executed by a registry server device having a communications module. The method includes storing in a database coupled to the registry server device, configuration files for a plurality of applications, each configuration file comprising an indication of data that can be shared with other applications. The method also includes receiving via the communications module, from a first application, a first request to obtain a trusted link to a second application, and sending to the first application, via the communications module, a first response comprising the trusted link. The method also includes receiving via the communications module, from the second application, a second request to verify the trusted link provided by the first application in association with the second application being invoked by the first application, and sending to the second application, via the communications module, a second response comprising a result of the verification.

In another aspect, there is provided a non-transitory computer readable medium for providing trusted links between applications. The computer readable medium includes computer executable instructions for storing in a database coupled to a registry server device, configuration files for a plurality of applications, each configuration file comprising an indication of data that can be shared with other applications. The computer readable medium also includes computer executable instructions for receiving via a communications module, from a first application, a first request to obtain a trusted link to a second application, and sending to the first application, via the communications module, a first response comprising the trusted link. The computer readable medium also includes computer executable instructions for receiving via the communications module, from the second application, a second request to verify the trusted link provided by the first application in association with the second application being invoked by the first application, and sending to the second application, via the communications module, a second response comprising a result of the verification.

In certain example embodiments, the trusted link can be signed by the registry server device to enable the second application to verify that query parameters provided by the first application have not been tampered with.

In certain example embodiments, the registry server device can receive a new configuration file and replace a current configuration file in the database to update parameters for at least one trusted link.

In certain example embodiments, if the trusted link cannot be found, the registry server device can return an error message to the second application indicative of a fraudulent or incorrect request provided by the first application.

In certain example embodiments, the first and second applications can be financial-related applications and the data that can be shared with other applications comprises financial data.

In certain example embodiments, one of the first application or the second application can be launched through a browser.

In certain example embodiments, the first request can include an application identifier associated with the second application.

In certain example embodiments, the first response can include a collection of uniform resource locators having been signed and verified by the registry server device.

In certain example embodiments, the registry server device can further include a cryptographic module, which can be accessed to verify the trusted link. The trusted link can be cryptographically signed.

In certain example embodiments, data to be shared can be sent by the first application to the second application from the registry server device. The first response can include an identifier to be provided to the second application, the second application having provide the identifier to the registry server device to initiate the sending.

FIG. 1 illustrates an exemplary computing environment 8 in which applications 12, 14 can securely communicate with each other by establishing a trusted link via a trusted registry server 10. In this example, the applications 12, 14 include "Application 1" also identified by numeral 12 (or referred to as a first application 12), and "Application 2" also identified by numeral 14 (or referred to as a second application 14). It can be appreciated that, as discussed further below, "application" as used herein can refer to the shorthand "app", webpages launched through a browser, or any other software modality that permits a user to interact with software functionality either locally or remotely, or both locally and remotely. The registry server 10 can include one or more devices with communication capabilities and be configured to provide a platform on which one or more services can reside to provide server capabilities to the applications 12, 14 acting as "clients" in this configuration.

The registry server 10 includes or has access to a configuration database 16 to store configuration files that define which trusted links can be issued to applications 12, 14 to communicate and/or share data and parameters with each other. The configuration database 16 provides a repository to allow the registry server 10 to update or be updated when such data or parameters change, to account for changes to permissions or to block certain interactions between applications 12, 14 when desired.

Figure 2:
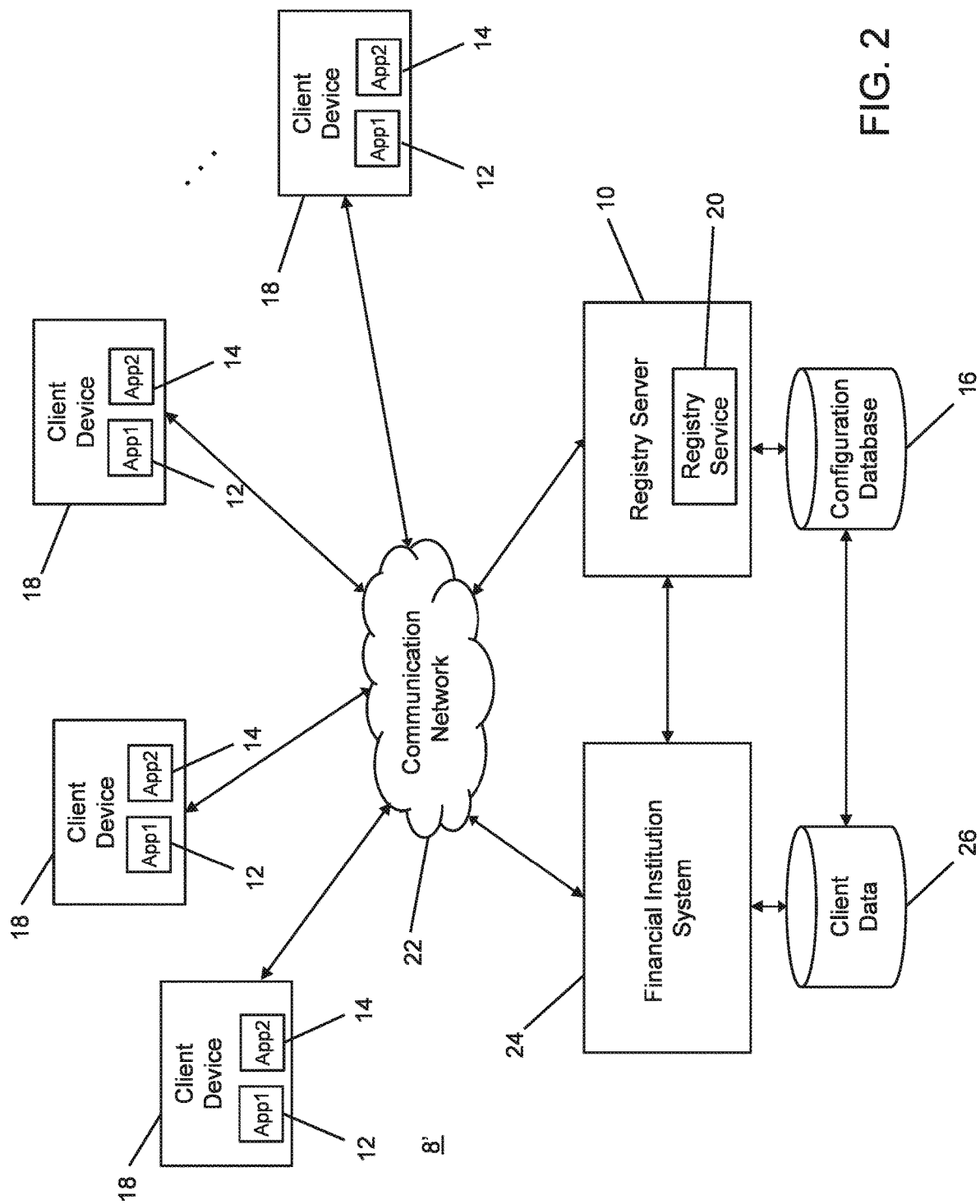
FIG. 2 is a schematic diagram of an example computing environment implementing the configuration shown in FIG. 1.

FIG. 2 illustrates an exemplary computing environment 8' which integrates the registry server 10 with a financial institution system 24, e.g., to enable financial-related applications 12, 14 to share information and/or communicate with one another and/or communicate with third party enterprises or organizations. In one aspect, the computing environment 8' may include the registry server 10, one or more client devices 18, and a communications network 22 connecting one or more components of the computing environment 8'. In this example, each client device 18 includes both the first and second applications 12, 14, however, this is for illustrative purposes and should not be considered limiting.

The computing environment 8' may also include a financial institution system 24 (e.g., a commercial bank) that provides financial services accounts to users and processes financial transactions associated with those financial service accounts. While several details of the financial institution system 24 have been omitted for clarity of illustration, reference will be made to FIG. 4 below for additional details. It can be appreciated that in this example scenario, at least one of the first and second applications 12, 14 may be associated with, developed, and/or provided by the financial institution system 24.

The financial institution system 24 includes or otherwise has access to a datastore for storing client data 26. The registry server 10 includes or otherwise has access to the datastore for storing configuration files, referred to herein as a configuration database 16. The configuration database 16 may have direct or indirect access to the client data 26 stored by the financial institution system 24. The registry server 10 may also provide a registry service 20 that runs on the server 10 to enable the applications 12, 14 to utilize the registry server 10 as a trusted party to exchange data and parameters for inter-application integration or workflows therebetween.

The client data 26 may include both data associated with a user of a client device 18 that interacts with the registry server 10 and financial institution system 24 (e.g., for participating in mobile banking) and transaction history data that is captured and provided with a transaction entry, e.g., in the graphical user interface of a mobile or web-based banking application. The data associated with a user can include client profile data that may be mapped to corresponding financial data 68 (see FIG. 4) for that user and/or may include some of the financial data 68. It can be appreciated that the financial data 68 shown in FIG. 4 could also include the client data 26 shown in FIG. 1 (or vice versa) and these datastores are shown separately for illustrative purposes. The client profile data can include both data that is associated with a client as well as data that is associated with one or more user accounts for that client as recognized by the computing environment(s) 8, 8'.

The client data 26 associated with a client may also include, without limitation, demographic data (e.g., age, gender, income, location, etc.), preference data input by the client, and inferred data generated through machine learning, modeling, pattern matching, or other automated techniques. The client profile data may also include historical interactions and transactions associated with the financial institution system 24, e.g., login history, search history, communication logs, documents, etc.

It can be appreciated that the configuration database 16 is shown separately from the registry server 10 for illustrative purposes only and may also be at least partially stored within a database, memory, or portion thereof within the registry server 10. It can also be appreciated that while the registry server 10 and financial institution system 24 are shown as separate entities in FIGS. 1 and 2, they may also be part of the same system. For example, the registry server 10 can be hosted and provided within the financial institution system 24.

Client devices 18 may be associated with one or more users. Users may be referred to herein as customers, clients, correspondents, or other entities that interact with the financial institution system 24 and/or registry server 10 (directly or indirectly). The computing environment 8' may include multiple client devices 18, each client device 18 being associated with a separate user or associated with one or more users. In certain embodiments, a user may operate client device 18 such that client device 18 performs one or more processes consistent with the disclosed embodiments. For example, the user may use client device 18 to engage and interface with a mobile or web-based banking application which uses or incorporates the registry server 10 to communicate with another application or browser, as herein described. In certain aspects, client device 18 can include, but is not limited to, a personal computer, a laptop computer, a tablet computer, a notebook computer, a hand-held computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device, and may be operable to transmit and receive data across communication network 22.

Communication network 22 may include a telephone network, cellular, and/or data communication network to connect different types of client devices 18. For example, the communication network 22 may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet).

In one embodiment, registry server 10 may be one or more computer systems configured to process and store information and execute software instructions to perform one or more processes consistent with the disclosed embodiments. In certain embodiments, although not required, registry server 10 may be associated with one or more business entities. In certain embodiments, registry server 10 may represent or be part of any type of business entity. For example, registry server 10 may be a system associated with a commercial bank (e.g., financial institution system 24), a retailer, or some other type of business or enterprise. The registry server 10 can also operate as a standalone entity that is configured to serve multiple business entities, e.g., to act as an agent therefor.

Continuing with FIG. 2, the registry server 10 and/or financial institution system 24 may also include a cryptographic server (not shown) for performing cryptographic operations and providing cryptographic services (e.g., authentication (via digital signatures), data protection (via encryption), etc.) to provide a secure interaction channel and interaction session, etc. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public and private keys in a PKI), and perform other cryptographic operations that are required or desired for particular applications of the registry server 10 and financial institution system 24. The cryptographic server may be used to protect the financial data 68 and/or client data 26 and/or configuration data in the configuration database 16 by way of encryption for data protection, digital signatures or message digests for data integrity, and by using digital certificates to authenticate the identity of the users and client devices 18 with which the financial institution system 24 and/or registry server 10 communicates to inhibit data breaches by adversaries. It can be appreciated that various cryptographic mechanisms and protocols can be chosen and implemented to suit the constraints and requirements of the particular deployment of the registry server 10 or financial institution system 24 as is known in the art.

Figure 3:
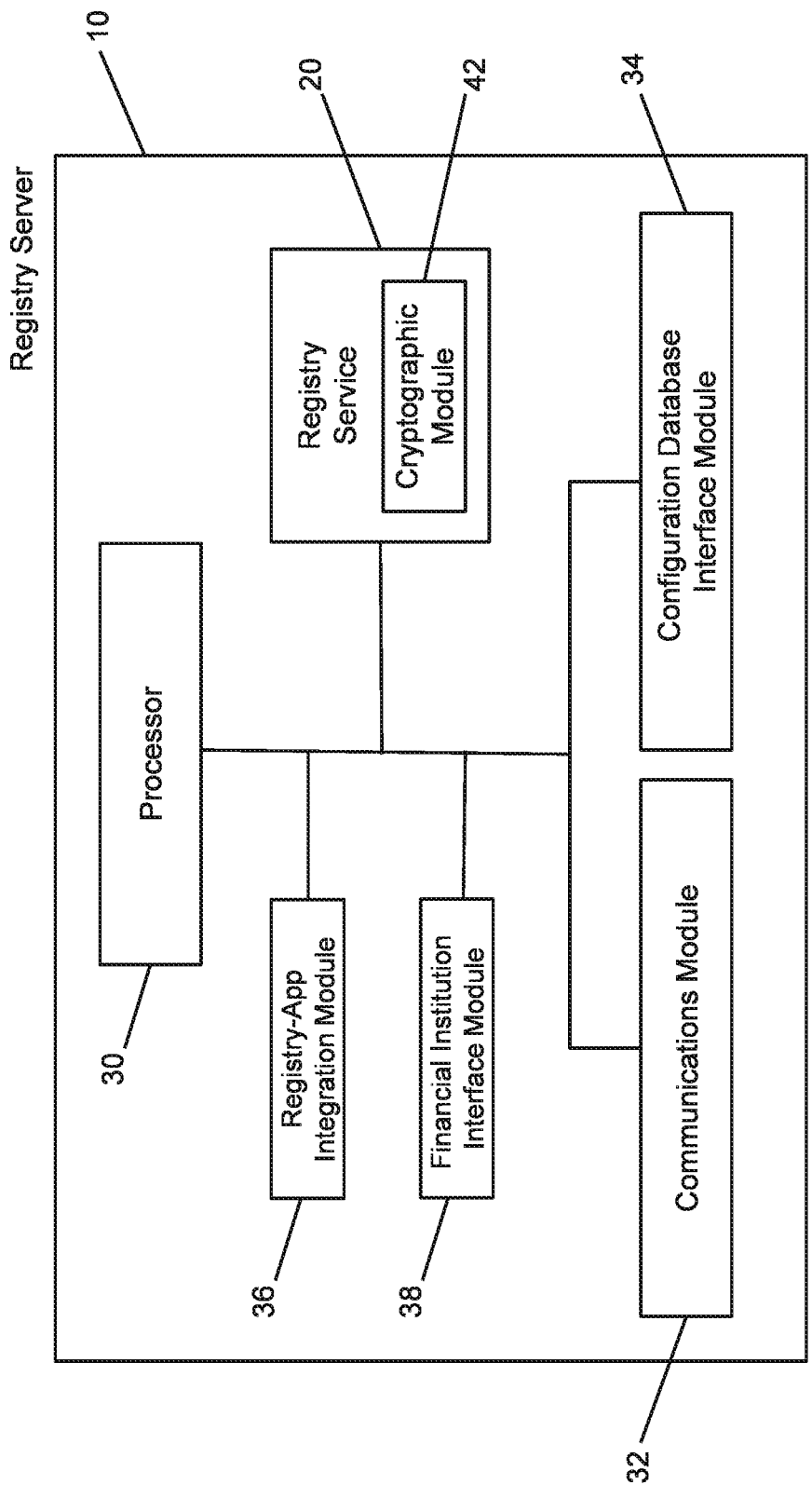
FIG. 3 is a block diagram of an example configuration of a registry server.

In FIG. 3, an example configuration of the registry server 10 is shown. In certain embodiments, the registry server 10 may include one or more processors 30, a communications module 32, and a configuration database interface module 34 for interfacing with the configuration database 16 (and if permitted client data 26) to retrieve, modify, and store (e.g., add) data. Communications module 32 enables the registry server 10 to communicate with one or more other components of the computing environment 8, 8' such as client device 18 (or one of its components), via a bus or other communication network, such as the communication network 22. While not delineated in FIG. 3, the registry server 10 includes at least one memory or memory device that can include a tangible and non-transitory computer-readable medium having stored therein computer programs, sets of instructions, code, or data to be executed by processor 30. FIG. 3 illustrates examples of modules, tools and engines stored in memory by the registry server 10 and operated by the processor 30. It can be appreciated that any of the modules, tools, and engines shown in FIG. 3 may also be hosted externally and be available to the registry server 10, e.g., via the communications module 32. In the example embodiment shown in FIG. 3, the registry server 10 includes a registry-app integration module 36, a financial institution interface module 38, and the registry service 20. The registry service 20 in this example includes or otherwise has access to a cryptographic module 42 for performing cryptographic operations such as a signing, verifying, encryption, decryption, etc. The cryptographic module 42 can be configured to enable the registry service 20 to provide cryptographic services, such as in verifying the trusted links shared between applications 12, 14, and/or additional functionality such as issuing certificates, implementing key management, or acting as a certificate authority. That is, the registry server 10 can integrate any security-related functionality to suit the computing environment 8, 8'.

The registry service 20 can be configured to apply a hierarchy of permission levels or otherwise apply predetermined criteria to determine what client data 26, application data, or financial data 68 can be shared with which entity in the computing environment 8' and/or between applications 12, 14. For example, the registry server 10 may have been granted access to certain sensitive client data 26 or financial data 68 for a user, which is associated with a certain client device 18 in the computing environment 8'. Similarly, certain client profile data stored in the client data 26 or financial data 68 may include potentially sensitive information such as age, date of birth, or nationality, which may not necessarily be needed by the registry server 10 to execute certain actions and/or may not necessarily be needed by applications 12, 14 that wish to communicate with each other or integrate features therebetween. As such, access control functionality can be used by the registry service 20 to control the sharing of certain client profile data or other client data 26 and/or financial data 68 based on a type of client/user/application, a permission or preference, or any other restriction imposed by the computing environment 8, 8' or application in which the registry server 10 is used.

The registry server 10 may also include a registry-app integration module 36 that is provided to enable applications 12, 14 in the computing environment 8, 8' to communicate with the registry server 10, e.g., via an existing banking application or other application used by the client for interfacing with the financial institution system 24. The registry-app integration module 36 can take the form of an application programming interface (API), software development kit (SDK) or any other software, plug-in, agent, or tool that allows the registry server 10 to be integrated with or within applications associated with the computing environment 8, 8'. For example, the registry-app integration module 36 can enable inter-app functionality to be integrated into a financial institution application 88 and/or other financial application 90 (see FIG. 5) to enable users of the client devices 18 to have data or parameters shared between applications 12, 14 to enhance functionality in one or both of the applications 12, 14.

Figure 4:
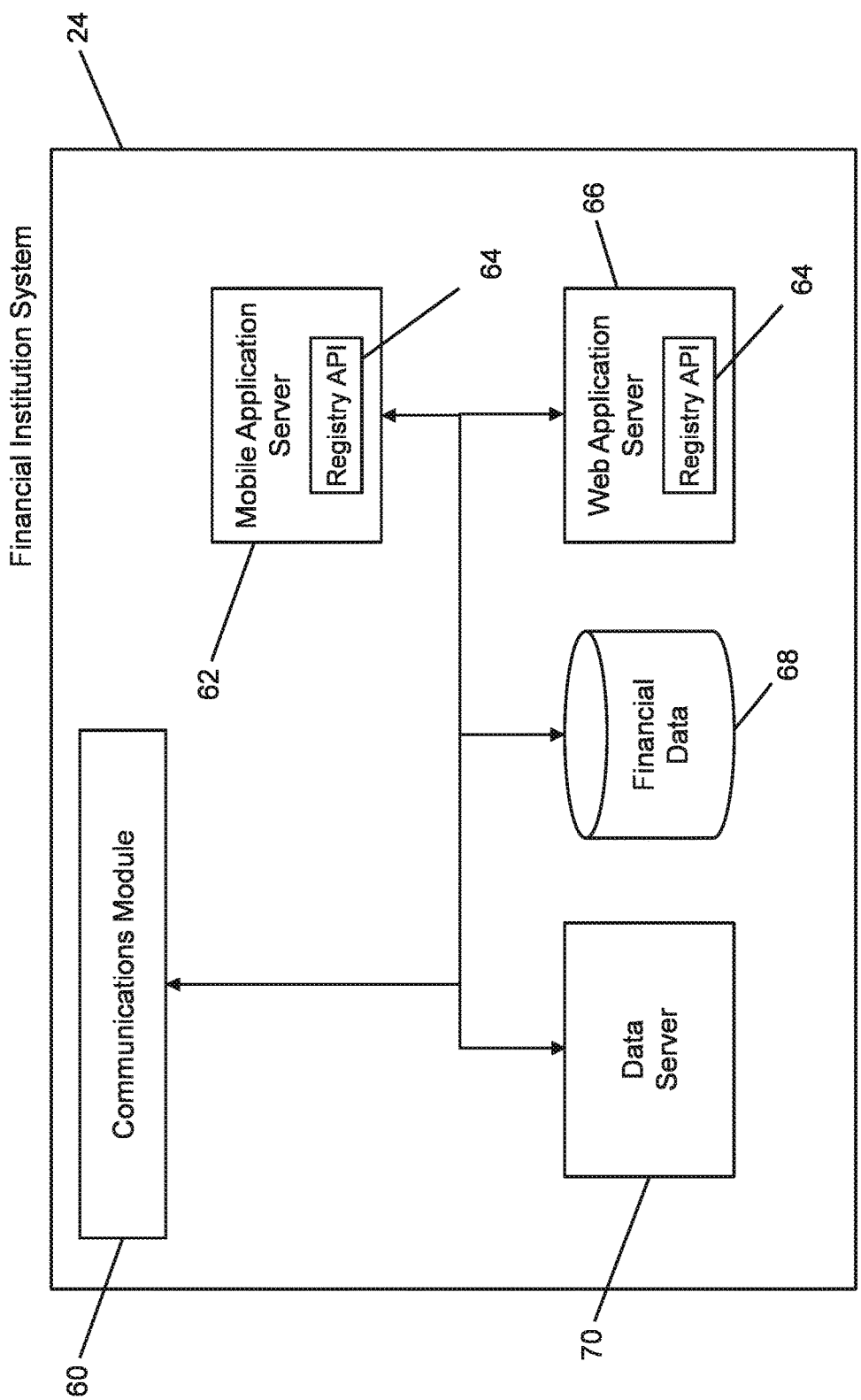
FIG. 4 is a block diagram of an example configuration of a financial institution system.

The registry server 10 may also include the financial institution interface module 38 to provide a graphical user interface (GUI) or API connectivity to communicate with the financial institution system 24 to obtain client data 26 and financial data 68 for a certain user (see FIG. 4). It can be appreciated that the financial institution interface module 38 may also provide a web browser-based interface, an application or "app" interface, a machine language interface, etc.

In FIG. 4, an example configuration of the financial institution system 24 is shown. The financial institution system 24 includes a communications module 60 that enables the financial institution system 24 to communicate with one or more other components of the computing environment 8', such as client device 18 (or one of its components) or registry server 10, via a bus or other communication network, such as the communication network 22. While not delineated in FIG. 4, the system 24 includes at least one memory or memory device that can include a tangible and non-transitory computer-readable medium having stored therein computer programs, sets of instructions, code, or data to be executed by one or more processors (not shown for clarity of illustration). FIG. 4 illustrates examples of servers and datastores/databases operable within the financial institution system 24. It can be appreciated that any of the components shown in FIG. 4 may also be hosted externally and be available to the system 24, e.g., via the communications module 60. In the example embodiment shown in FIG. 4, the financial institution system 24 includes one or more servers to provide access to the client data 26 (which may be included in the financial data 68 or stored separately as shown in FIG. 2) to the registry server 10 to enable the registry server 10 to provide and verify trusted links, parameters, and data to applications 12, 14. Exemplary servers include a mobile application server 62, a web server 66 and a data server 70. Although not shown in FIG. 4, as noted above, the system 24 may also include a cryptographic server for performing cryptographic operations and providing cryptographic services. The cryptographic server can also be configured to communicate and operate with a cryptographic infrastructure. The system 24 may also include one or more data storages for storing and providing data for use in such services, such as data storage for storing financial data 68.

Mobile application server 62 supports interactions with a mobile application installed on client device 18. Mobile application server 62 can access other resources of the financial institution system 24 to carry out requests made by, and to provide content and data to, a mobile application on client device 18. In certain example embodiments, mobile application server 62 supports a mobile banking application to provide payments from one or more accounts of a user, among other things. As shown in FIG. 4, the mobile application server 62 can include a registry API 64 which enables the mobile application to integrate or otherwise coordinate or work with the registry server 10 to provide an inter-app linking functionality. For example, the registry API 64 can communicate with the registry server 10 via the registry-app integration module 36 in the registry server 10 (see FIG. 3). This allows, for example, a first application 12 to invoke, integrate or otherwise communicate with a second application 14 or a browser as herein described.

Web application server 66 supports interactions using a website accessed by a web browser application 92 (see FIG. 5) running on the client device 18. It can be appreciated that the mobile application server 62 and the web application server 66 can provide different front ends for the same application, that is, the mobile (app) and web (browser) versions of the same application. For example, the financial institution system 24 may provide a banking application that be accessed via a smartphone or tablet app while also being accessible via a browser on any browser-enabled device. As shown in FIG. 4, the web application server 66 may also include a registry API 64 to enable the web application to integrate or otherwise coordinate or work with the registry server 10 to provide inter-app linking functionality.

The financial data 68 may be associated with users of the client devices 18 (e.g., customers of the financial institution). The financial data 68 may include any data related to or derived from financial values or metrics associated with customers of the financial institution system 24, for example, account balances, transaction histories, line of credit available, credit scores, mortgage balances, affordability metrics, investment account balances, investment values and types, among many others. Other metrics can be associated with the financial data 68, such as financial health data that is indicative of the financial health of the users of the client devices 18. As indicated above, it can be appreciated that the client data 26 shown in FIG. 2 may be part of the financial data 68 held by the financial institution system 24 and is shown separately for ease of illustration and ease of reference herein.

Figure 5:
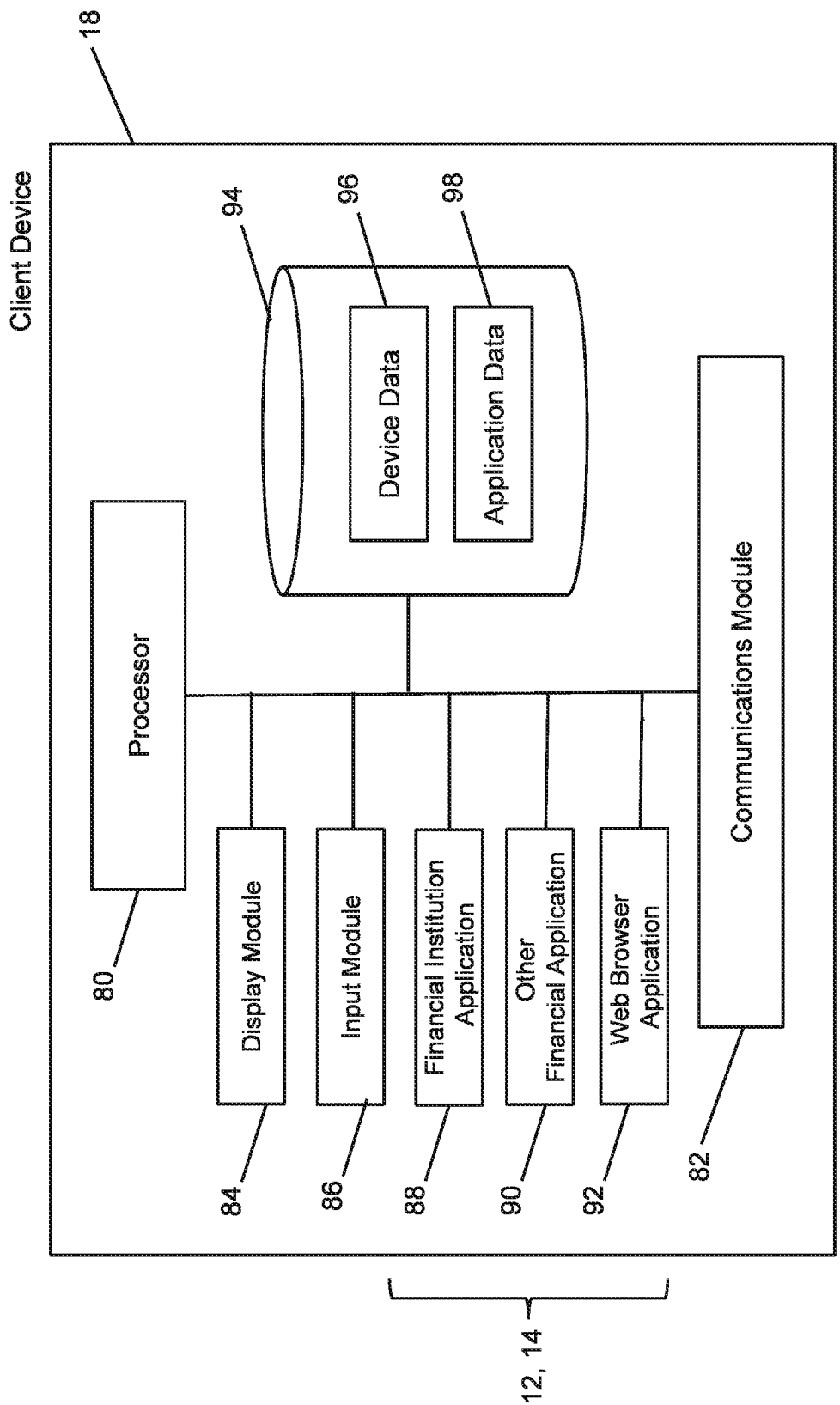
FIG. 5 is a block diagram of an example configuration of a client computing device associated with a user, customer, or client.

In FIG. 5, an example configuration of the client device 18 is shown. In certain embodiments, the client device 18 may include one or more processors 80, a communications module 82, and a data store 94 storing device data 96 and application data 98. Communications module 82 enables the client device 18 to communicate with one or more other components of the computing environment 8, 8', such as registry server 10 or financial institution system 24, via a bus or other communication network, such as the communication network 22. While not delineated in FIG. 5, the client device 18 includes at least one memory or memory device that can include a tangible and non-transitory computer-readable medium having stored therein computer programs, sets of instructions, code, or data to be executed by processor 80. FIG. 5 illustrates examples of modules and applications stored in memory on the client device 18 and operated by the processor 80. It can be appreciated that any of the modules and applications shown in FIG. 5 may also be hosted externally and be available to the client device 18, e.g., via the communications module 82.

In the example embodiment shown in FIG. 5, the client device 18 includes a display module 84 for rendering GUIs and other visual outputs on a display device such as a display screen, and an input module 86 for processing user or other inputs received at the client device 18, e.g., via a touchscreen, input button, transceiver, microphone, keyboard, etc. The client device 18 may also include a financial institution application 88 provided by their financial institution system 24, e.g., for performing mobile banking operations, and another financial application 92, such as a spending application, cash transfer application, credit card application, etc. The client device 18 in this example embodiment also includes a web browser application 92 for accessing Internet-based content, e.g., via a mobile or traditional website. The data store 94 may be used to store device data 96, such as, but not limited to, an IP address or a MAC address that uniquely identifies client device 18 within environment 8, 8'. The data store 94 may also be used to store application data 98, such as, but not limited to, login credentials, user preferences, cryptographic data (e.g., cryptographic keys), etc.

It will be appreciated that only certain modules, applications, tools and engines are shown in FIGS. 3 to 5 for ease of illustration and various other components would be provided and utilized by the registry server 10, financial institution system 24, and client device 18, as is known in the art.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of any of the servers or other devices in registry server 10 or financial institution system 24, or client device 18, or accessible or connectable thereto. Any application or module herein described may be implemented using computer readable/executable instructions that may be stored or otherwise held by such computer readable media.

Figure 6:
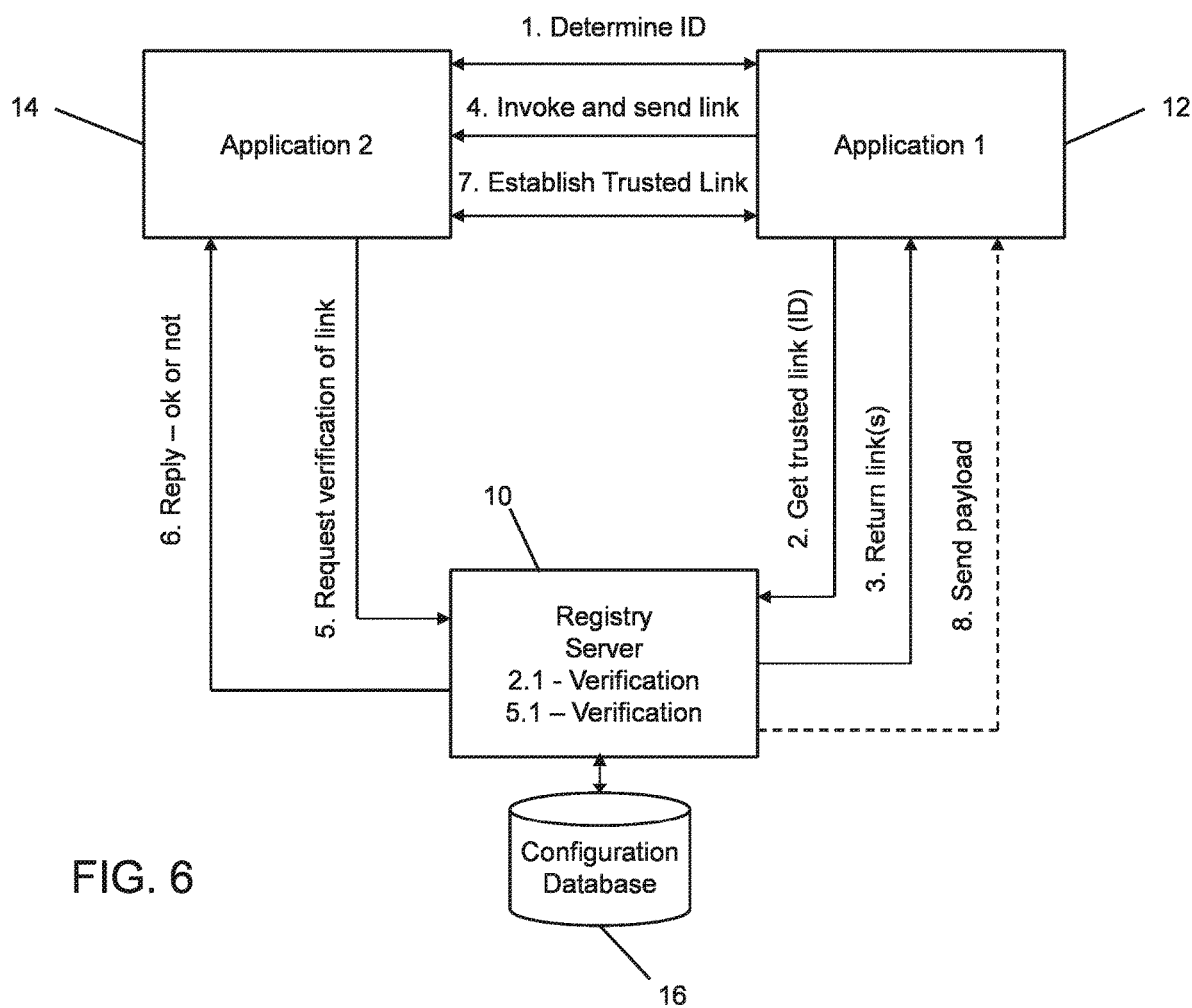
FIG. 6 is a sequence flow diagram illustrating example communications between first and second applications and a registry server.

FIG. 6 illustrates a communication flow between a first application 12, a second application 14, and the registry server 10 to enable the first application 12 to invoke the second application 14 and for the applications 12, 14 to establish a trusted link between them, using the registry server 10. In operation 1, the first application 12 determines an identifier (ID) associated with the second application 14, which can indicate the version of the second application 14 as well as identifying the second application 14 to enable the first application 12 to notify the registry server 10 accordingly. For example, when invoking the second application 14, the first application 12 may need to determine which version is running of the second application 14 to ensure the correct parameters or payload is provided and this can dictate which trusted link is provided by the registry server 10.

In operation 2, the first application 12 connects to the registry server 10 to get the trusted link associated with the ID it has determined for the second application 14. It can be appreciated that the trusted link can take the form of a secure address, secure channel or any other credential that enables such a channel to be established between applications 12, 14. At operation 3, the registry server 10 returns one or more links to the first application 14. For example, the registry server 10 may provide such links on a request-by-request basis or provide a batch of all links available to the first application 12 at that time, according to the data in the configuration database 16. As such, operations 1, 2, and 3 can be provisioning operations that are performed periodically or in real-time, depending on the nature of the application, how and what the applications will share, etc. That is, operations 1, 2, and 3 need not be done sequentially and immediately before operation 4. As shown in FIG. 6, operation 2.1 can include a verification process executed by the registry server 10, e.g., using the cryptographic module 42, to verify the first application 12 and/or the first application's granted permissions with respect to establishing trusted links between one or more second applications 14.

In operation 4, the first application 12 invokes the second application 14, e.g., to obtain parameters and/or a data payload, to establish a trusted communication channel therebetween, or to have the second application 14 perform an operation or integrate with the first application 12 in some way. When invoking the second application 14, the first application 12 can provide the appropriate link obtained from the registry server 10. To ensure authenticity, the link may be signed by the registry server 10. By providing the link in operation 4, the second application 14 is able to verify this link before agreeing to establish the trusted link.

In operation 5, the second application 14 requests a verification of the link by the registry server 10. This enables the second application 14 to verify the authenticity of the permissions granted to the first application 12 in communicating with or integrating with the second application 14. For example, the trusted link can include a command (to send certain data or to integrate in a prescribed way), a payload (with data) or both a command and the payload. Rather than hardcoding the permissions and thus data or integration that can be permitted, the registry server 10 is used as a trusted authority to keep up-to-date permissions, signed using cryptographic keys or using other cryptographic mechanisms. In operation 5.1, the link can be verified, e.g., by initiating a signature verification protocol to verify a signed link. The registry server 10 may then reply to the second application 14 in operation 6 to indicate whether the link can be verified (i.e., it is ok) or not.

In operation 7, the first and second applications 12, 14 can establish the trusted link. As indicated above, the trusted link can be used for various purposes, including communicating, exchanging data, executing commands, or any combination of these operations. As shown in dashed lines in FIG. 6, the first and second applications 12, 14 can rely on the registry server 10 to send a payload of data or parameters to the first application 12 rather than having the second application 14 send same. This allows further protections to be applied to the payload itself. For example, a payload may include sensitive data such as financial data 68 that the second application 14 may display but is not authorized to store. In this case, the registry server 10 could be relied upon to connect to the financial institution system 24 to obtain the sensitive payload and send that payload to the first application 12 once the trusted link is verified and established. In this way, the trusted link in operation 7 can be used to exchange requests or commands to trigger the registry server 10 to deliver the payload in operation 8.

Figure 7:
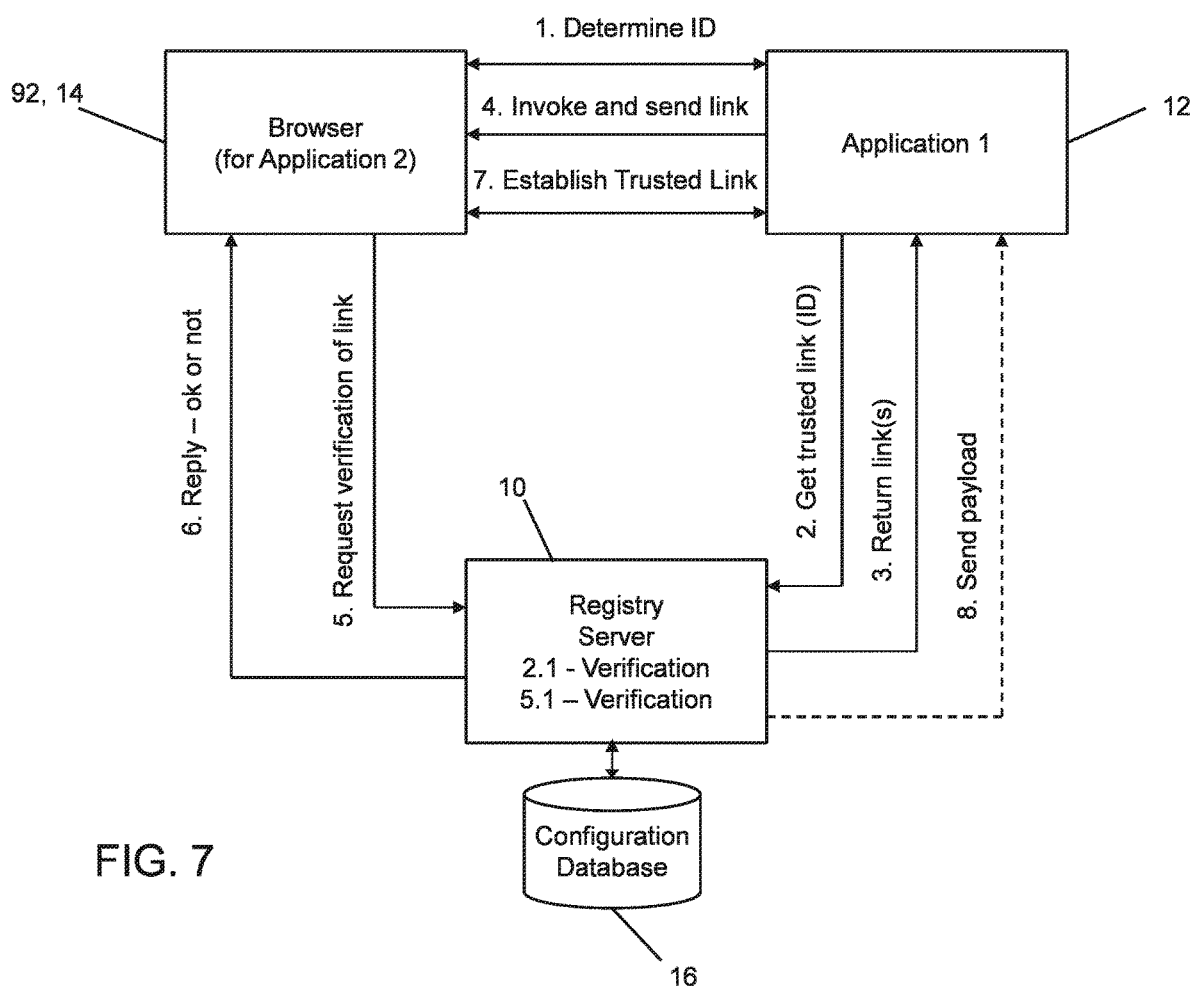
FIG. 7 is a sequence flow diagram illustrating example communications between a first application, a browser, and a registry server.

FIG. 7 illustrates that the same configuration and communication flow as shown in FIG. 6 is applicable to applications 12, 14 invoking other applications 12, 14 using a browser application 92. That is, a web based version of the second application 14 or an application that is only web based can also rely on the registry server 10 to verify and establish a trusted link. As such, operations 1-8 can proceed in the manner described above and further details need not be reiterated. It can be appreciated that the configuration shown in FIG. 7 is also suitable for an application running in a browser 92 to invoke and link to an application 12, 14, or to establish a trusted link with another browser-based application (i.e. another instance (window or tab) of the browser application 92), according to the same principles shown in FIGS. 6 and 7.

Figure 8:
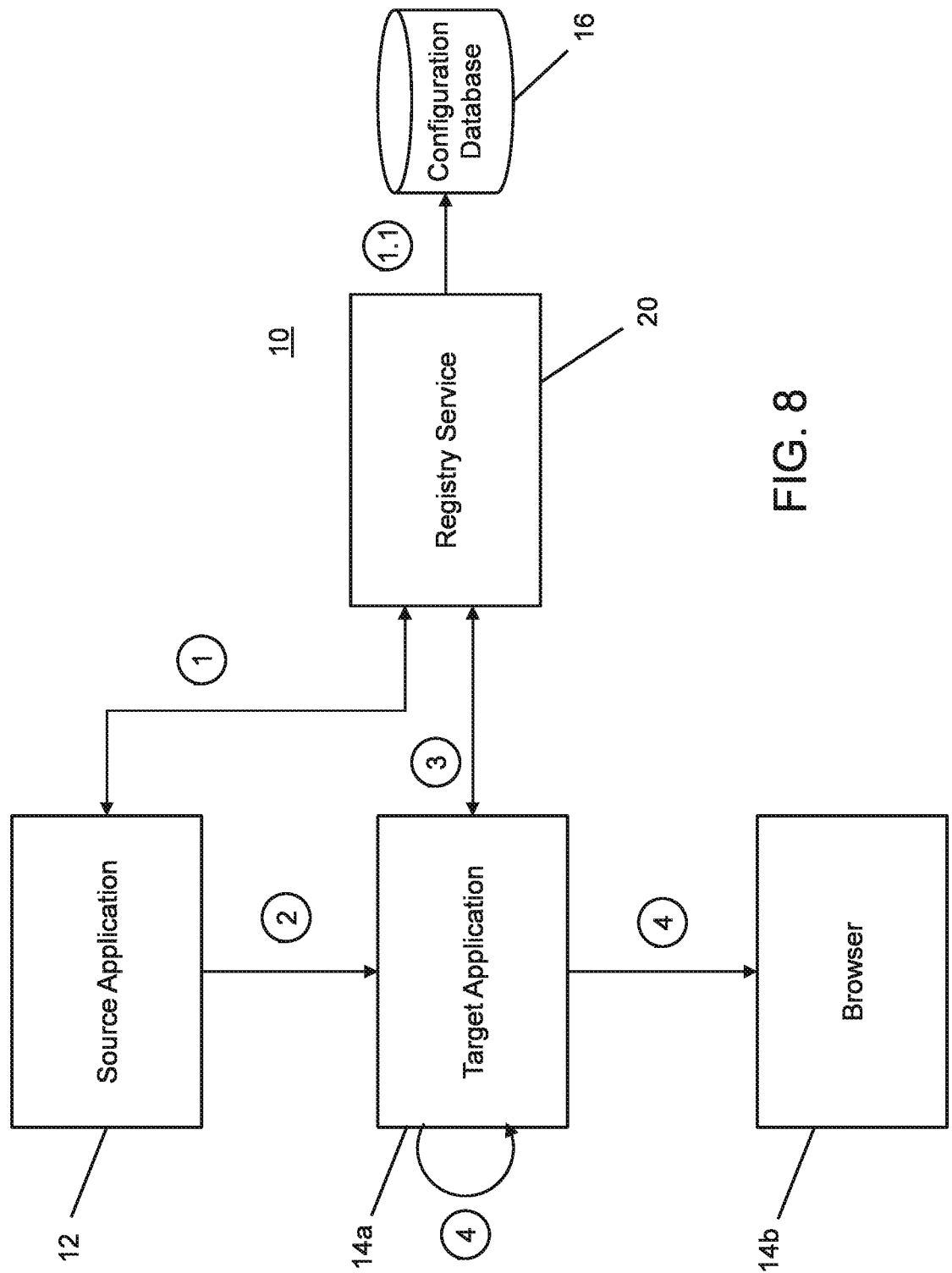
FIG. 8 is a sequence flow diagram illustrating example communications between a source application, a target application, a browser, and a registry service of the registry server.

FIG. 8 illustrates another example communication flow between a source application 12 and a target application 14a to invoke a browser 14b by establishing a trusted link using the registry service 20 of the registry server 10.

In operation 1, the source application 12, which can be a third party app or an organization-developed app, calls the registry service 20 with an application ID identifying itself and/or identifying the target application 14a. The registry service 20 at operation 1.1 accesses the configuration database 16 to determine a trusted link or collection of trusted links (e.g., URLs) that are associated with the source application 12 or are specific to the target application 14a. For example, the registry service 20 can return a URL or collection of URLs that have been signed and verified by the relevant organization to ensure that the URLs have not been tampered with. Optionally, additional payloads can be returned that has also been signed to ensure this has not been tampered with.

In operation 2, the source application 12 invokes the target application 14a and provides the signed URL. In operation 3, the target application 14 calls the registry service 20, to verify that the signature and its associated query parameters have not been tampered with. The registry service 20 can perform a cryptographic verification function using the cryptographic module 42 to verify the link provided by the source application 12 to the target application 14a and verify that this is a valid link in the configuration database 16. The registry service 20 can respond indicating that the verification was successful or not. An unsuccessful verification indicates that the signature could not be verified by the cryptographic module 42 and therefore may be fraudulent, expired, or out of date. In this way, the registry service 20 can be used to keep up-to-date permissions for inter-app linking to ensure that applications are only sharing or communicating with each other according to permissions granted by the organization(s) responsible for deploying those applications 12, 14. For example, an organization that enables a third party application to invoke and obtain information from one of its own applications can control what information is shared and/or which operations are permitted and can use the configuration database 16 to make changes or updates over time.

If the result of operation 3 replies that the verification was successful, this indicates that the URL provided to the target application 14a is legitimate and not fraudulent as it has been signed by the organization. In operation 4, the target application 14a may then refresh or load an internal screen or invoke the browser version 14b of the target application 14a to allow the source application 12 to execute the verified parameters using the trusted link.

Figure 9:
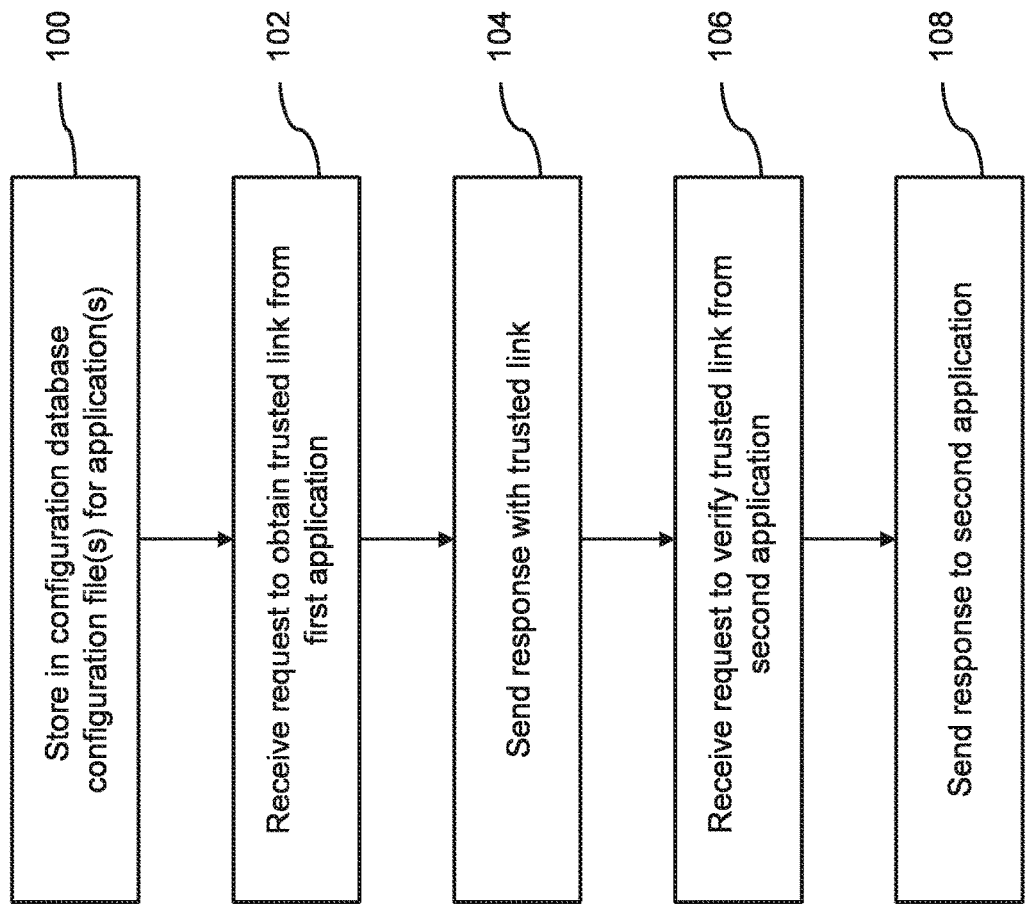
FIG. 9 is a flow diagram of an example of computer executable instructions for providing trusted links between applications.

Referring to FIG. 9, an example embodiment of computer executable instructions for establishing trusted links between applications is shown. At block 100, the registry server 10 stores one or more configuration files for one or more applications in the configuration database 16. This operation can be initiated by the financial institution system 24 or any other system, organization or entity that utilizes or includes the registry server 10. For example, the financial institution system 24 may use the registry server 10 to control how multiple applications within the financial institution organization are able to communicate and/or integrate with each other. At block 102, the registry server 10 receives from the first application 12, a request to obtain or establish a trusted link. At block 104, the registry server 10 sends a response to the first application 12, with the trusted link, e.g., a URL that is signed and can be verified by a second application 14. This allows the first application 12 to provide the trusted link to the second application 14 such that, at block 106, the registry server receives, from the second application 14, a request to verify the trusted link that it obtained. The registry service 10 can use the configuration database 16 and/or the cryptographic module 42 to verify that the trusted link shared between the applications 12, 14 is legitimate or has not been tampered with and can send a response to the second application at block 108 indicating the result of the verification operation.

FIGS. 10 and 11 illustrate GUIs in an example of a command or operation executed using a trusted link between applications 12, 14. FIG. 10 provides a credit card transfer app 120 that can invoke the financial institution app 90 (e.g., a mobile banking app) to enable a transfer of funds from a credit account to a bank account. In this example, the transfer app 120 includes an amount entry box 122 and a drop-down selection menu 124 to enable the user to select a target account for transferring the funds from the credit account. A logo 126 or other identifying information associated with the target organization (and thus target application 14) may also be shown. Here, it can be appreciated that the transfer app 120, acting as the first (or source) application 12, uses the registry server 10 in a background process to establish a trusted link with/to the financial institution app 90 in order to populate the drop-down selection menu 124 with the user's financial accounts and, optionally, balances and other information. That is, the registry server 10 can be used to enable the credit card transfer app 120 to invoke and interact with the financial institution app 90 to provide a seamless fund transfer. As illustrated in FIG. 10, after selecting a Transfer button 128, in addition to initiating the transfer of funds, the trusted link can enable an automated launch of the financial institution app 90 shown in FIG. 11.

In FIG. 11, an account details page 140 of the financial institution application 90 is illustrated, showing a transfer initiated using the credit card transfer app 120. The account details page 140 includes a number of options for completing actions in association with the chequing account, and a portion that provides multiple tabs. In FIG. 11 an activity tab 142 is being displayed, which lists a number of transactions, each with a transaction entry 144. By establishing the trusted link as herein described, the user can view the credit card transfer entry 146 and an associated transfer fee 148 based on the action initiated in the credit card transfer app 120. The mechanism illustrated in FIG. 11 can be applied in various other scenarios. For example, a spending or budgeting app that assists user in managing their finances could use the trusted link to invoke the financial institution app 90 to arrange fund transfers from a chequing account to a saving account or to a registered savings plan. In this way, an inter-app communication can be established via the trusted registry server 10 to avoid the need to navigate between applications 12, 14.

Figure 12:
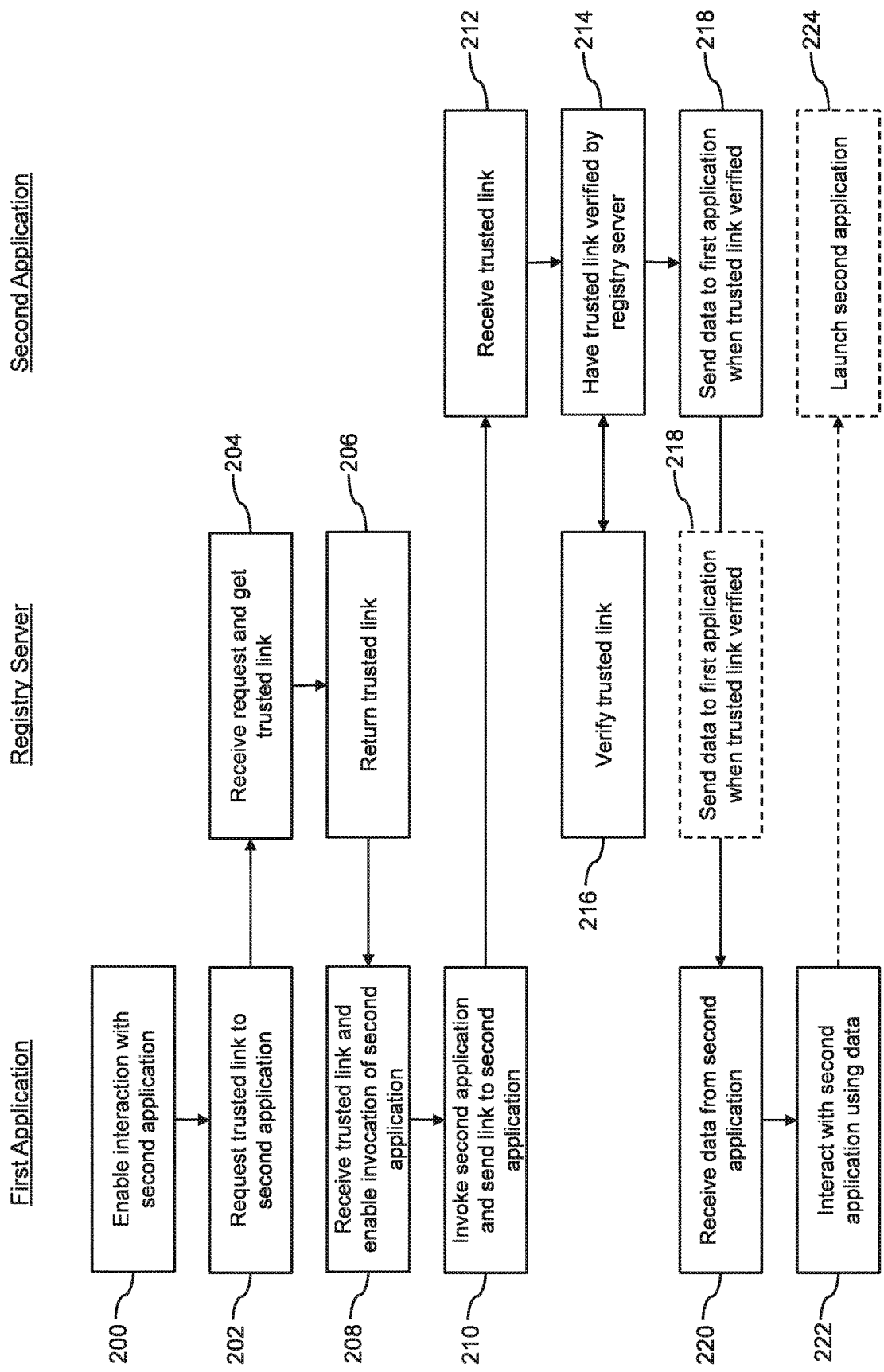
FIG. 12 is a flow diagram of an example of computer executable instructions for establishing a trusted link between applications.

Referring now to FIG. 12, an example embodiment of computer executable instructions for establishing a trusted link between applications is shown. At block 200, the first application 12 provides an option or initiates a process to enable an interaction with the second application 14. At block 202 a request for a trusted link to the second application 14 is sent to the registry server 10. At block 204 the registry server 10 receives the request and gets the trusted link, if available and permitted to. At block 206 it is assumed that the trusted link can be found and is returned to the first application 12.

At block 208 the first application 12 receives the trusted link and enables the invocation of the second application 14 which, at block 210 also includes sending the trusted link to the second application 14. The second application 14 receives the trusted link at block 212 and has the trusted link verified by the registry server 10 at block 214 to ensure that it is legitimate and/or has not be tampered with by an adversary. The registry server 10 can verify the trusted link at block 216. At block 218 the second application 14 can send data to the first application 12 when the trusted link is verified. As shown in dashed lines, block 218 may instead be performed at least in part by the registry server 10. The data can include information, commands, messages, files, documents, values, other payloads, etc.

At block 220 the first application 12 receives the data from the second application 14 directly or via the registry server 10 which allows the first application 12 to interact with the second application 14 using the data (e.g., by populating a menu of options as shown in FIG. 10). Optionally, as shown in dashed lines, the second application can also be launched at block 224 through the interaction(s) with the first application 12.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:
1. A registry server device for providing trusted links between applications, the registry server device comprising:
   a processor;
   a memory coupled to the processor, the memory storing computer executable instructions that when executed by the processor cause the processor to:
      store in a database coupled to the registry server device, query parameters for a plurality of applications;
      receive, from a first application, a first request to obtain a trusted link to communicate with a second application;
      provide the trusted link, wherein the trusted link is signed by the registry server device and identifies one or more query parameters of the first request;
      send a first response comprising the trusted link to the first application;
      receive, from the second application, a second request to verify, at least in part, permissions defined by the one or more query parameters identified based on the trusted link; and
      send a second response to the second application, the second response comprising a result of the verification that enables the second application to verify that the signed trusted link was not tampered with and that the one or more query parameters of the first request have not been tampered with.

2. The device of claim 1, wherein the computer executable instructions further cause the processor to:
receive new query parameters; and
replace current query parameters in the database to update query parameters for at least one trusted link.

3. The device of claim 1, wherein the first and second applications are financial related applications and the data that can be shared with other applications comprises financial data.

4. The device of claim 1, wherein one of the first application or the second application is launched through a browser.

5. The device of claim 1, wherein the first request comprises an application identifier associated with the second application.

6. The device of claim 1, wherein the first response comprises a collection of uniform resource locators having been signed and verified by the registry server device.

7. The device of claim 1, further comprising a cryptographic module, wherein the computer executable instructions further cause the processor to access the cryptographic module to verify the trusted link.

8. The device of claim 7, wherein the trusted link is cryptographically signed.

9. The device of claim 1, wherein the computer executable instructions further cause the processor to:
send the data to be shared by the first application to the second application from the registry server device.

10. The device of claim 9, wherein the first response comprises an identifier to be provided to the second application, the second application having to provide the identifier to the registry server device to initiate the sending of the data to be shared by the first application to the second application.

11. The device of claim 1, wherein the trusted link facilitates the first application obtaining a data payload from the second application.

12. A method of providing trusted links between applications, the method executed by a registry server device and comprising:
storing in a database coupled to the registry server device, query parameters for a plurality of applications;
receiving, from a first application, a first request to obtain a trusted link to communicate with a second application;
providing the trusted link, wherein the trusted link is signed by the registry server device and identifies one or more query parameters of the first request;
sending to the first application, a first response comprising the trusted link;
receiving, from the second application, a second request to verify, at least in part, permissions defined by the one or more query parameters identified based on to the trusted link; and
sending to the second application a second response comprising a result of the verification that enables the second application to verify that the signed trusted link was not tampered with and that the one or more query parameters of the first request have not been tampered with.

13. The method of claim 12, further comprising:
receiving query parameters; and
replacing current query parameters in the database to update query parameters for at least one trusted link.

14. The method of claim 12, further comprising accessing a cryptographic module to verify the trusted link.

15. The method of claim 12, further comprising:
sending the data to be shared by the first application to the second application from the registry server device.

16. The method of claim 15, wherein the first response comprises an identifier to be provided to the second application, the second application having to provide the identifier to the registry server device to initiate the sending of the data to be shared by the first application to the second application.

17. The method of claim 12, wherein the trusted link facilitates the first application obtaining a data payload from the second application.

18. The method of claim 12, wherein one of the first application or the second application is launched through a browser.

19. The method of claim 12, wherein the first and second applications are financial related applications and the data that can be shared with other applications comprises financial data.

20. A non-transitory computer readable medium for providing trusted links between applications, the computer readable medium comprising computer executable instructions for:
storing in a database coupled to a registry server device, query parameters for a plurality of applications;
receiving, from a first application, a first request to obtain a trusted link to communicate with a second application;
providing the trusted link, wherein the trusted link is signed by the registry server device and identifies one or more query parameters of the first request;
sending to the first application, a first response comprising the trusted link;
receiving, from the second application, a second request to verify, at least in part, permissions defined by the one or more query parameters identified based on the trusted link; and
sending to the second application, a second response comprising a result of the verification, wherein the result of the verification that enables the second application to verify that the signed trusted link was not tampered with and that the one or more query parameters of the first request have not been tampered with.

* * * * *